United States Patent
Nayak et al.

[11] Patent Number: 5,940,238
[45] Date of Patent: Aug. 17, 1999

[54] MECHANISM TO REDUCE ADJACENT TRACK INTERFERENCE IN A MAGNETIC TAPE DATA STORAGE SYSTEM

[75] Inventors: Ashok B. Nayak, Glendora; Donald Joseph Digna, Mission Viejo, both of Calif.

[73] Assignee: Seagate Technology, Inc., Scotts Valley, Calif.

[21] Appl. No.: 08/764,495

[22] Filed: Dec. 12, 1996

Related U.S. Application Data

[60] Provisional application No. 60/070,834, Jun. 7, 1996.

[51] Int. Cl.$^6$ ....................................................... G11B 5/00
[52] U.S. Cl. ............................................ 360/76; 360/77.12
[58] Field of Search ................... 360/75, 76, 77.12, 360/78.02, 69, 78.01, 104, 105, 106, 109

[56] References Cited

U.S. PATENT DOCUMENTS

| | | | |
|---|---|---|---|
| 4,321,634 | 3/1982 | Lehureau | 360/77.12 X |
| 4,539,615 | 9/1985 | Arai et al. | 360/76 X |
| 4,758,907 | 7/1988 | Okamoto et al. | 360/48 |
| 5,241,442 | 8/1993 | Akashi | 360/76 X |
| 5,262,908 | 11/1993 | Iwamatsu et al. | 360/77.12 |
| 5,293,281 | 3/1994 | Behr et al. | 360/77.12 |
| 5,307,217 | 4/1994 | Saliba | 360/76 |
| 5,371,638 | 12/1994 | Saliba | 360/77.12 |
| 5,452,152 | 9/1995 | Rudi | 360/77.12 |

*Primary Examiner*—Paul W. Huber
*Attorney, Agent, or Firm*—Edward P. Heller, III; Raghunath S. Minisandram

[57] ABSTRACT

An apparatus and method for reducing adjacent track interference in a tape drive data storage system which employs a single read/write head controllably movable to any desired one of a plurality of parallel data tracks extending parallel with the length of the tape. The method consists of intentionally introducing azimuths of opposite direction for accesses to adjacent data tracks, with the magnitude of the introduced opposite azimuths being selected to exceed the azimuth range at which the head is capable of reliably reading data. In the apparatus of the invention the actuator used to move the head from track to track is mounted on a pivotable plate member, and the pivoting of the plate member is controlled by a stepper motor driven by control logic responsive to the access command being executed. Alternative mechanisms for connecting the stepper motor to the pivotable plate member are disclosed

4 Claims, 10 Drawing Sheets

MECHANISM TO REDUCE ADJACENT TRACK INTERFERENCE IN A MAGNETIC TAPE DATA STORAGE SYSTEM

RELATED APPLICATION

This application claims priority to United States Provisional Application Serial No. 60/070,834, filed Jun. 7, 1996.

BACKGROUND OF THE INVENTION

1. Field of the Invention

The present invention is directed generally to the field of magnetic tape data storage devices, and more particularly, but not by way of limitation, to an apparatus and method for reducing interference between data recorded on adjacent tracks on magnetic tape, thereby allowing an increase in the amount of data which can be stored on the tape.

2. Brief Description of the Prior Art

Magnetic tape data storage devices, also referred to as tape drives, have been used in the computer industry for years for the storage of large amounts of data. While magnetic disc drives, because of their greater speeds, have become the medium of choice for storing frequently accessed data such as application programs and user data which is being created or frequently modified, tape drives have achieved preeminence as storage devices for long-term and data backup purposes.

The technology of tape drives has evolved from large, expensive open reel machines to the current generations of cassette tape drives, which store large amounts of data in convenient self-contained cassettes. Historically, open reel tape drives recorded data on parallel data tracks which extend along the length of the tape, and utilized fixed data recording/retrieval heads, i.e., one dedicated read/write head for each data track.

The actual recording and recovery of data on the tape medium is accomplished by a gap in the read/write head, and is in the form of magnetic flux reversals formed in the magnetic coating on the tape. In order to maximize the sharpness of the flux reversals—and thus the amplitude of the read data pulses induced in the head during subsequent read operations—the length of the head gaps is aligned as precisely as possible with the direction of tape motion past the heads.

Historically, in order to ensure the integrity of data written on the tape, such tape drives included multi-gap heads, with one gap employed to write data and another gap, immediately trailing the write gap along the direction of tape motion, used as a read gap which could perform a read/verify operation on the data just recorded. If the tape drive was intended to record/recover data with the tape moving in both directions, an additional write or read gap was needed.

In tape drives of the type in which it is envisioned that the present invention would be employed, however, the head includes a single gap utilized for both writing and reading data, and data integrity is ensured through the use of ECC coding, or other data verification methods.

Several cassette-type tape drive formats have recently become industry standards, including the format referred to as the QIC, or quarter inch cassette, format in which the present invention is particularly useful. In QIC format tape drives, data are recorded on a plurality of data tracks which extend parallel with the length of the tape as was typical in open reel type tape drives, but employ only a single recording/playback head which is controllably movable to each of the data tracks. A commonly used mechanism for controlling the movement of the head from track to track employs a worm gear driven by a stepper motor, with the pitch of the worm gear and the radial precision of the stepper motor determining the accuracy of head movement, including the repeatability of multiple head movements to any one given track.

One of the major factors controlling the overall storage capacity of tape storage devices is referred to as track density, which is a definition, typically in data tracks per inch of tape width, of how closely the data tracks are spaced. The greater the track density, the greater number of tracks that can be recorded on a given width of tape and the greater the overall cassette data capacity.

A well known factor limiting track density is referred to as adjacent track interference, which is the corruption or loss of data brought about when data on a given track is written at a location touching or even overlapping the previously recorded data on an adjacent data track. In such a situation, the amplitude of the readback signal can be reduced, and there is a limit to the amount of readback signal reduction which can be tolerated and beyond which data can be corrupted or lost completely.

Another known factor controlling the ability of the tape drive to recover previously recorded data is a characteristic of the tape drive referred to as head azimuth, or simply azimuth, which is a measurement of the alignment between the longitudinal direction of the data tracks and the gap of the read/write head.

In the specifications defining the QIC tape drive and tape cassettes, one of the major planar surfaces of the cassette, called the cassette base plate, contains features which define a datum referred to as the tape cassette -B- plane. The tape cassette -B- plane is used, in conjuction with mating features on the tape drive which comprise a tape drive -B- plane, to define a mating surface between the tape cassette and the tape drive, and thus a base datum for defining the locations of both tape cassette and tape drive components and features along an axis normal to the common -B- plane.

Because the data tracks extend along the length of the tape, the length of the head gap which accomplishes the recording and retrieval of data on the data tracks is nominally parallel with the length of the data track and thus also nominally parallel to the -B- plane. It is known, however, that small deviations from this nominally parallel relationship are introduced by component and manufacturing tolerances. It is this geometric relationship between the length of the head gap and the -B- plane which is referred to as azimuth. When the length of the head gap is parallel to the -B- plane, or, in other words, when the width of the gap is perpendicular to the -B- plane, azimuth is considered to be zero, with deviations from parallel in a first direction being referred to as positive azimuth and deviations in the opposite direction being referred to as negative azimuth. Non-zero azimuths are typically measured in units of rotation, such as minutes.

In tape drives of the current generation, allowable deviations in azimuth typically include variations of, for example, ±10 minutes. When azimuth exceeds these allowable limits, signal degradation can lead to either data corruption or loss due to reduction in read signal amplitude. That is, if the azimuth of the gap during read operations is sufficiently tilted from the azimuth during a previous write operation, the magnetic flux reversals recorded will not be abrupt enough to induce read data pulses of a large enough amplitude to be distinguishable from noise inherent in the system.

Tape drives used for recording video images have made use of this knowledge for several years to reduce intertrack interference and maximize the amount of storage on a given area of tape surface. Most video recorders, however, utilize rotating, or helical scan, heads, rather than the linear heads toward which the present invention is directed, although some art does exist which is more relevant to the present invention.

U.S. Pat. Nos. 5,307,217 and 5,371,638, for instance, (hereinafter the '217 and '638 patents, respectively) disclose apparatus and methods directed to recording data at opposite azimuth angles on adjacent data tracks in order to minimize intertrack interference, and thus maximize data capacity on tape media. There are, however, several differences in both the type of tape drive in which the disclosed method and apparatus are employed and in the specific apparatus which implements the recording of data at opposite azimuth on adjacent data tracks.

Firstly, the '217 and '638 patents describe tape drives which include discreet tape reels which are mounted on individual drive motors, rather than the cassette tape drive in which the present invention is particularly useful.

Secondly, the '217 and '638 patents describe tape systems in which a read/verify operation is performed after every write operation, which necessitates the inclusion of specially fabricated heads, illustrated in both the '217 and '638 patents in FIGS. 2, 6 and 7. These custom heads include an arrangement of paired write gaps, laterally spaced and longitudinally aligned, with a read gap disposed laterally between the write gaps and offset from the write gaps along the longitudinal axis. With this arrangement of gaps, one of the write gaps and the single read gap are employed for accesses to one set of alternate tracks, while the other write gap and the read gap are used to record and recover data on the interleaved other set of alternate tracks. Both the '217 and '638 patents note that the same results could be achieved using a pair of laterally spaced read gaps and an intermediate, offset write gap. This disclosure contrasts sharply with the single write/read gap head envisioned for use in the tape drive of the present invention.

Thirdly, the '217 and '638 patents disclose an apparatus for rotating the head to align selected write gap/read gap pairs with the desired data track which includes mounting the head on the shaft of a rotary motor and mounting the rotary motor/head assembly on a stepper motor-driven linear actuator for movement from track to track. This mechanism is very different from the apparatus of the present invention, as will be apparent from the description to follow.

A need clearly exists for a method and apparatus for minimizing or eliminating adjacent track interference, thus leading to increased data reliability, increased track density and increased overall data capacity in tape drives.

SUMMARY OF THE INVENTION

The present invention acts to reduce adjacent track interference in tape drive systems by intentionally introducing azimuth in opposite directions when reading and writing adjacent tracks. The amount of azimuth introduced for a given track is selected to prevent unintended reading of previously recorded data from adjacent tracks.

In the presently preferred embodiment, the head is mounted for movement from track to track across the tape along a guide shaft, which is in turn attached to a plate member. The plate member is supported at a first end, displaced from the guide shaft along the length of the tape in a first direction, by a pivot shaft which extends in a plane substantially parallel to the -B- plane of the tape drive and substantially perpendicular to the direction of motion of tape motion past the head. The plate member is supported at a second end, displaced from the guide shaft in a second direction opposite the first direction, by an actuator mechanism which tilts the plate member out of parallelism with the -B- plane in a first direction when the head is referencing a first group of alternate tracks, and in a second opposite direction when the head is referencing a second group of alternate tracks interposed between the first group of alternate tracks. This tilting of the plate member in turn tilts the guide shaft out of perpendicularity with the -B- plane, causing the azimuth of the head in relationship to the tape to be in opposite directions for adjacent tracks, which prevents spurious signals from tracks on either side of the track being referenced from degrading the read signal from the track being referenced.

In the presently preferred embodiment, the actuator mechanism which tilts the plate member includes a stepper motor mounting a threaded member which engages a nut member compliantly mounted on the second end of the plate member.

It is an object of the present invention to reduce adjacent track interference in a magnetic tape data storage system.

It is a further object of the present invention to allow data tracks on the surface of the magnetic tape of a magnetic tape data storage system to be placed in closer proximity than would be reliably possible without the implementation of the present invention.

It is another object of the present invention to increase the overall data storage capacity of the magnetic tape data storage system.

It is another object of the invention to provide a magnetic tape drive with reduced adjacent track interference which is simple and economical to manufacture in high volumes.

It is yet another object of the invention to provide a magnetic tape drive which is capable of accessing data previously recorded on prior art magnetic tape drives in which the nominal azimuth is zero, in order to maintain backward compatibility.

These and other objects, features and benefits of the present invention may best be understood by a review of the following Detailed Description of the Preferred Embodiment, when read in conjunction with examination of the accompanying drawings.

DETAILED DESCRIPTION OF THE PREFERRED EMBODIMENT

Figure 1:
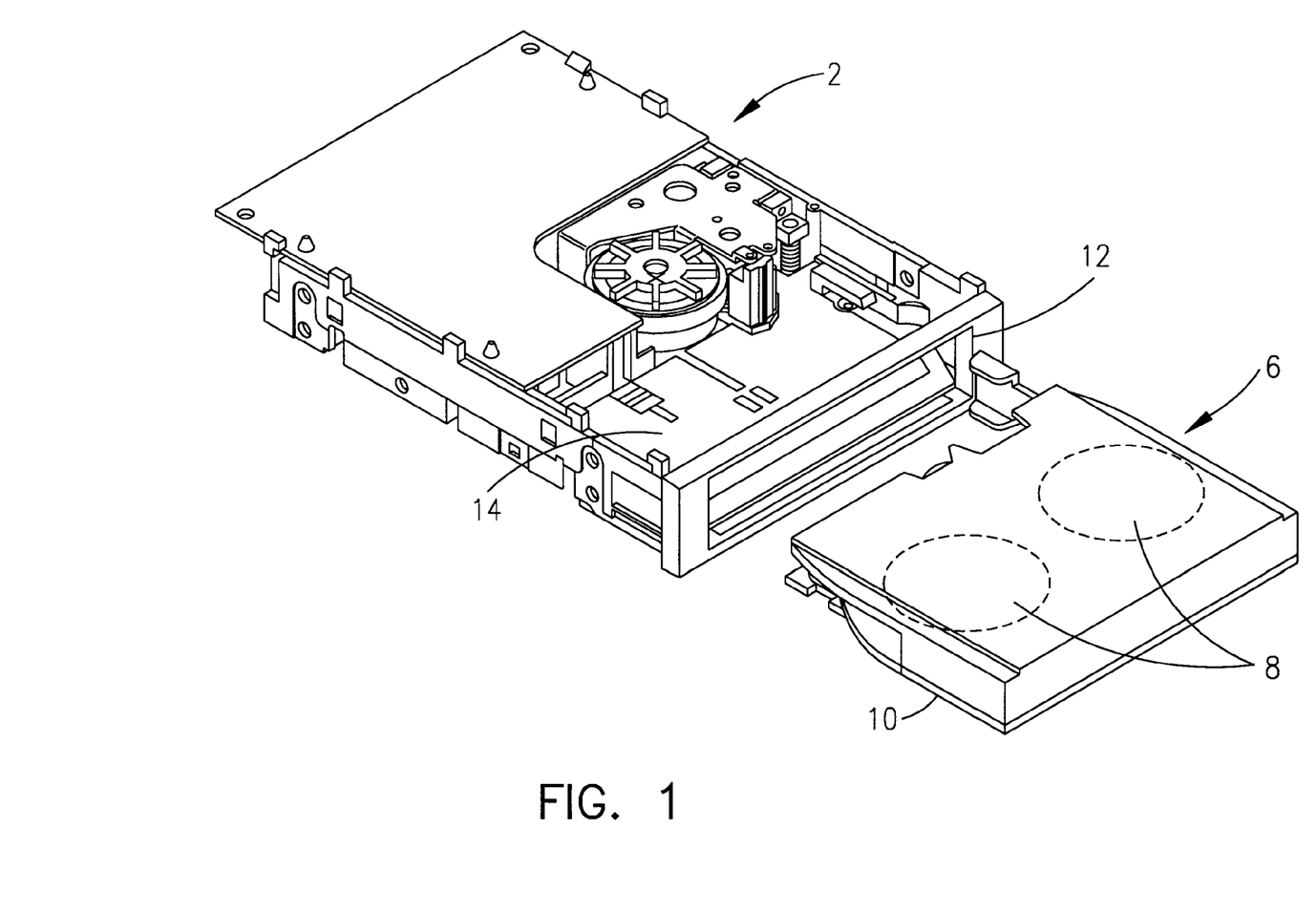
FIG. 1 is a perspective drawing of the major components of a magnetic tape data storage system in which the present invention is particularly useful.

Turning now to the figures and specifically to FIG. 1, shown are the major elements of a magnetic tape storage system in which the present invention is particularly useful. The magnetic tape data storage system includes a tape drive 2, which would typically be mounted within and connected to a computer system or data storage subsystem for a computer system (not shown). Control and status signals necessary to control the tape drive 2, as well as data being transferred to or from the tape drive 2 and power to operate the tape drive 2, are passed via cables connected to a printed circuit board (both also not shown) mounted to the tape drive 2.

The magnetic tape data storage system also includes a tape cassette 6 which houses a quantity of magnetic tape carried on captive reels shown generally at 8. The lower surface of the tape cassette 6 forms a cassette base plate 10, which acts as a datum surface from which all vertical dimensions of the tape cassette 6 are referenced.

The tape opening 12 of the tape drive 2 also includes a lower surface 14 which engages the cassette base plate 10 when the tape cassette tape 6 is inserted in the tape opening 12 of the tape drive 2. In order to control the vertical locations of tape drive components which interact with the tape cassette 6, features on the frame adjacent this lower surface 14 define the tape drive -B- plane which acts as the datum surface for vertical dimensions within the tape drive 2. When the tape cassette 6 is operatively mounted, or registered, within the tape drive 2, the tape cassette -B- plane features and the tape drive -B- plane features are in contact, establishing a common -B- plane vertical datum surface for both the tape cassette 6 and the tape drive 2. In tape drives of the current generation, the repeatability of the -B- plane reference datum is approximately 2 minutes.

Figure 2A:
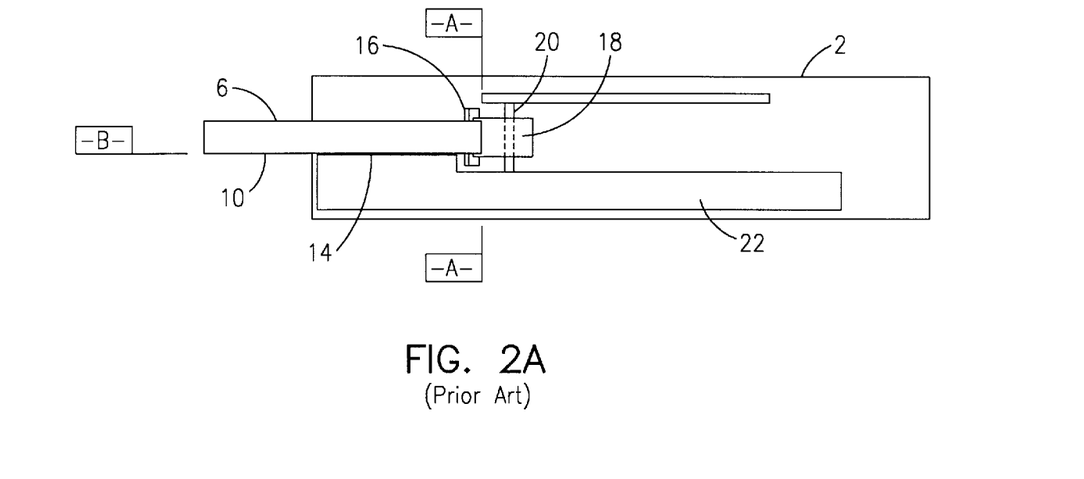
FIGS. 2A and 2B are simplified diagrammatic elevation and plan views, respectively, of the magnetic tape storage system elements of FIG. 1, showing the system elements in their intended operative relationship.

Turning now to FIG. 2A, shown is a simplified diagrammatic elevation view of the tape drive 2 and tape cassette 6 as they would be in their operative relationship. FIG. 2A also shows the -B- plane of the tape system as that line identified by the two flags designated by the label -B-. As can been seen in the figure, the -B- plane is coincident with the lower surface of the base plate 10 of the tape cassette 6 and the lower surface 14 of the tape opening 12 (as shown in FIG. 1) of the tape drive 2 when the tape cassette 6 and tape drive 2 are operatively engaged. The figure also shows that the system also includes a designated -A- plane which coincides with that surface of the tape cassette 6 which is furthest inserted into the tape drive 2.

FIG. 2A also shows a head 16 which engages data tracks on the tape within the tape cassette 6. This head 16 is mounted on a head carriage 18 which is in turn movable up and down in the figure. Movement of the head carriage 18 is guided by a guide shaft 20 fixedly attached to a base member 22 within the tape drive 6. The guide shaft 20 cooperates with a cylindrical opening (not designated) in the head carriage 18. A typical mechanism for driving the head carriage 18 along the guide shaft 20 will be discussed below.

Figure 2B:
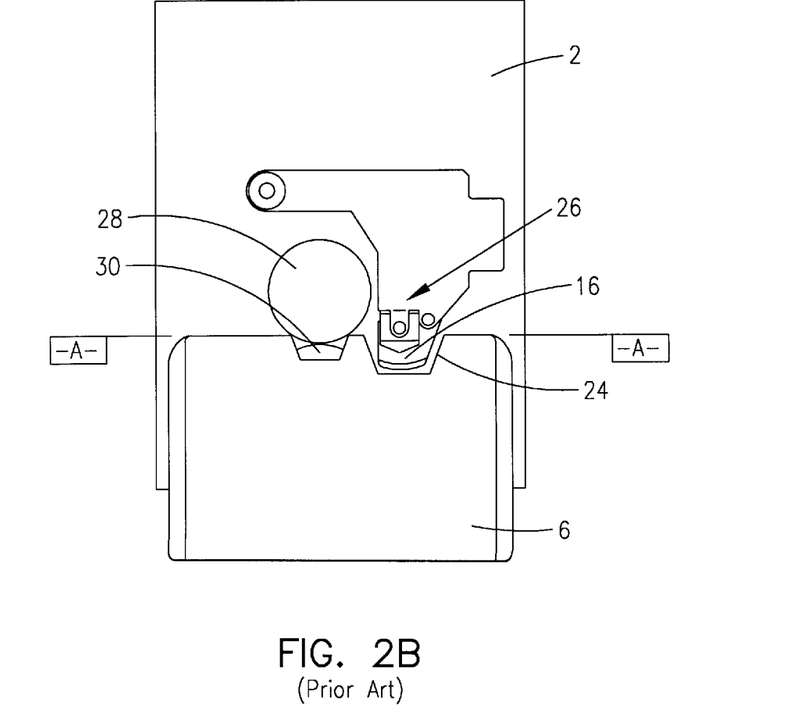

FIG. 2B is a simplified diagrammatic plan view of the tape system as shown in FIG. 2A. The figure again shows the -A- plane reference datum, as well as the operative relationship between the tape drive 2 and the tape cassette 6. As can be seen in the figure, when the tape cassette 6 is inserted into the tape drive 2, the head 16 extends beyond the -A- plane into a head opening 24 in the tape cassette 6, where it contacts the tape (not designated) within the tape cassette 6.

The head actuator mechanism which serves to translate the head 16 from track to track on the tape is located in that area generally designated 26. A tape drive motor 28, mounted to the base member (22 in FIG. 2A) of the tape drive 2, serves to move the tape past the head 16 by frictional contact with an idler capstan 30 which is a part of the tape cassette 6. It is well known to those of skill in the art that rotation of the idler capstan 30 serves to turn the reels holding the tape inside the tape cassette 6 via an arrangement of internal belts, driving the tape past the head 16 in the direction and at the speed determined by the tape drive motor 28.

Figure 3A:
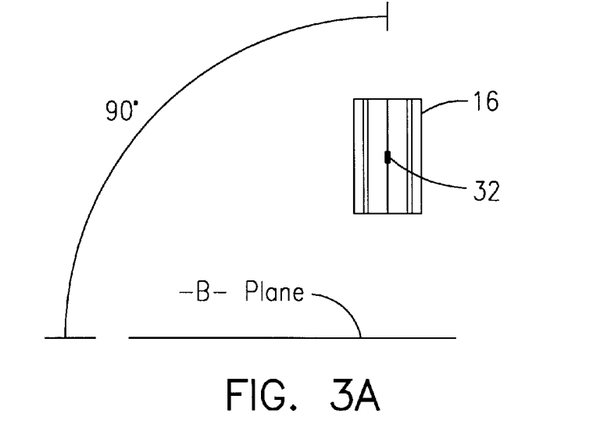
FIGS. 3A, 3B and 3C are diagrammatic drawings illustrating zero, positive and negative azimuth relationships, respectively, between certain components of the magnetic tape data storage system of FIGS. 1, 2A and 2B.
Figure 3B:
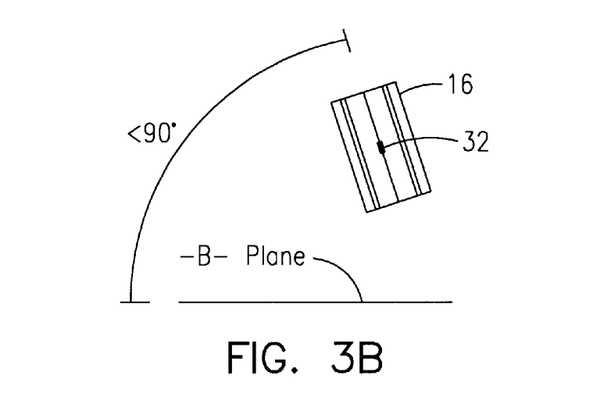
Figure 3C:
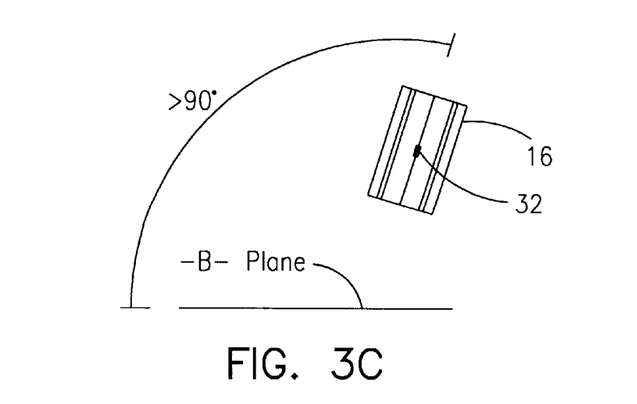

Turning now to FIGS. 3A, 3B and 3C, shown are diagrammatic representations of the geometric relationship between tape drive and tape cassette components which is referred to as azimuth. In all three figures, the -B- plane common to both the tape drive 2 and tape cassette 6 is shown as a horizontal line. The read/write head 16 of the tape drive 2 is also shown in the figures, along with the gap 32 which actually accomplishes the functions of writing and reading data on the tape. For purposes of the following discussion, the gap length is defined as that dimension of the gap 32 extending parallel with the length of the data track on the tape, and the gap width is that gap dimension extending perpendicular to the length of the data track. Thus the gap height would be that dimension of the gap measured along an axis normal to the plane of the recording media.

In FIG. 3A, the major axis of the head 16 is shown to be perpendicular to the -B- plane, which would in turn place the operative length of the gap 32 in parallel with the -B- plane and the length of the data track on the tape. Such a relationship is designated zero azimuth. FIGS. 3B and 3C show the head 16 rotated in relationship to the -B- plane in counterclockwise and clockwise directions, respectively, and represent positive and negative azimuth relationships, also respectively. It should be recalled that non-zero azimuths of greater than about ±10 minutes from the azimuth of previously recorded data would result in an inability of the head to reliably retrieve that data in tape drives of the current technology, and it should be noted here that the azimuth angles shown in FIGS. 3B and 3C are greatly exaggerated in comparison to any actual azimuths which would be found in actual tape data storage systems and are for illustrative purposes only.

As was previously noted above, it is a known phenomenon that if data are recorded at a first azimuth and an attempt to retrieve those data is made with a different azimuth, the amplitude of the read data signal induced in the head will be reduced, and that if the difference between the write and read azimuth, or azimuth delta, is greater than a certain threshold amount, it will be impossible to distinguish between the retrieved data and system noise. The azimuth delta threshold is a function of the specific combination of head, tape and read/write electronics. It is this known phenomenon which the present invention exploits to achieve reduction in adjacent track interference.

Specifically, the present invention intentionally introduces positive azimuth during all references to one set of alternate tracks and negative azimuth for the other set of alternate tracks which lie between the tracks of the first set of tracks.

Before proceeding further, it is perhaps best to review current industry practices relating to data track layout and numbering. In tape drive systems of the current generation, data are recorded to and retrieved from the tape with the tape moving in the same direction relative to the head. It is, however, possible to write and retrieve data in a "forward" direction or in an opposite "reverse" direction. With the tape moving in either of these directions, positioning of the head relative to the data track centerline can be maintained within a close tolerance which is, at least in part, dependent on the mechanical characteristics of the tape cassette. In tape drives of the current generation, this "one-direction" tolerance is on the order of ±500 microinches. When, however, the direction of tape motion is reversed, the necessity of taking up the tolerancing variations in the mechanics of the tape cassette introduces a "reversing tolerance" on the order of ±1000 microinches. Therefore, if two adjacent tracks were to be written in opposite directions, the distance between the two track centers would have to be established taking into consideration this reversing tolerance. It has become industry practice, therefore, to place all tracks intended for access in a first direction to be placed in a group on half of the tape width, with all tracks intended for access in the opposite direction on the second half of the tape width. A "forward/reverse guard band" is interposed between these two groups of tracks. In this manner, all tracks intended for access in one direction can be spaced with allowance only for the smaller "one-direction" tolerance and only a single "forward/reverse guard band" need be provided for an entire tape cassette. This allows greater track density capability than if a forward/reverse guard band were provided between each pair of adjacent tracks.

It is also standard industry practice to number all of the tracks intended for access in a first direction with even track numbers while all tracks intended for access in the opposite direction—and thus on the opposite side of the forward/reverse guard band—are provided with odd track numbers. For instance, all "forward" tracks can be even numbered while all "reverse" tracks are odd numbered, or vice versa. In this manner, the least significant bit of the track address could be used to determine the direction in which the track is accessed, and the side of the forward/reverse guard band on which the track is located.

All aspects of the ensuing discussion will apply equally to either the group of "forward" tracks or the group of "reverse" tracks, and references to odd and even tracks should be taken to refer to alternate tracks within the same group, rather than to sequentially numbered tracks in alternate groups. Therefore, when reference is made to the "least significant bit of the track address", the reference is intended to encompass that bit of the track address which distinguishes between adjacent tracks within the group.

For purposes of this disclosure, it will be assumed that all odd numbered tracks will be written and read with positive azimuth introduced, while all even numbered tracks will be referenced with negative azimuth introduced. It should be noted, however, that the assignment of positive and negative azimuth to either set of alternate tracks is purely a matter of choice and should not be considered as limiting to the scope of the invention.

The second aspect of the present invention is that the amount of azimuth delta intentionally introduced is selected to be significantly greater than the threshold amount of azimuth delta which ordinarily introduces data retrieval ambiguity with the particular combination of head and tape. For example, in one tape drive currently manufactured by the assignee of the present invention, the azimuth delta tolerance is set at ±10 (ten) minutes.

It is envisioned that the present invention would introduce approximately 120 minutes of positive azimuth for odd tracks and 120 minutes of negative azimuth for even tracks. This produces an azimuth delta between adjacent tracks of 240 minutes (4 degrees), which is approximately ten times the azimuth delta normally allowed in tape drive systems which attempt to minimize azimuth on all tracks.

Figure 4A:
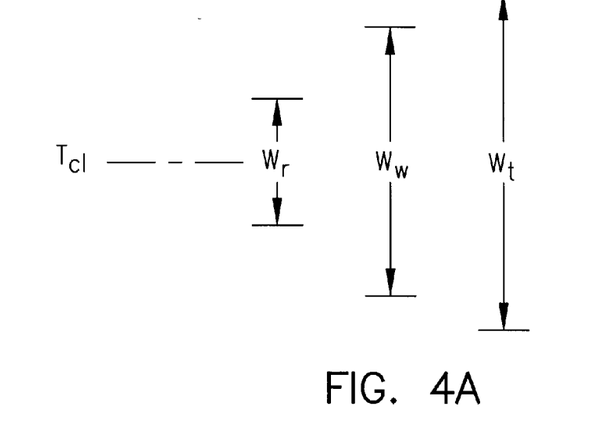
FIG. 4A is a diagrammatic representation of factors influencing track density in a tape drive.
Figure 4B:
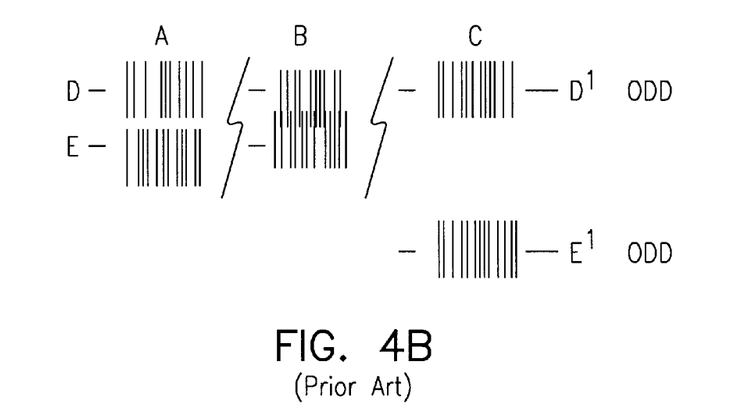
FIG. 4B is a diagrammatic representation of a flux reversal pattern typical to prior art tape storage systems.
Figure 4C:
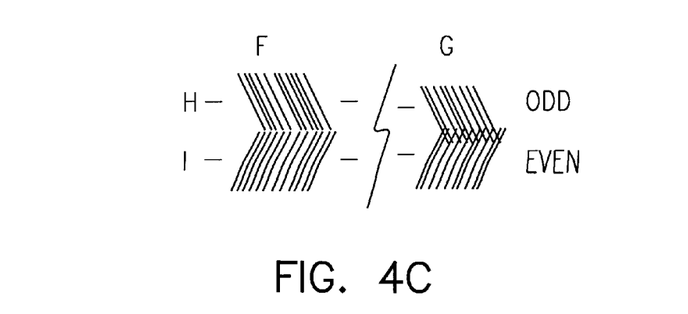
FIG. 4C is a diagrammatic representation of the flux reversal pattern achievable through implementation of the present invention.

The limitations of prior art tape recording systems compared with the effects of this intentionally introduced azimuth delta between adjacent tracks can perhaps be best understood by an examination of FIGS. 4A, 4B and 4C.

FIG. 4A is a representative diagram illustrating some of the factors of magnetic recording in tape drives which must be considered for an understanding of the limits on track density. In FIG. 4A, the nominal track centerline is represented at $T_{cl}$, and it is about this centerline that the magnetic flux reversals on the tape surface are recorded. Tape drives of the current technology perform what is known as "write wide/read narrow" operations. This is a reflection of the fact that, while a particular head may have a nominal gap width, during write operations the magnetic flux which is induced in the head extends from the head gap not only in the axis normal to the tape surface, but also laterally to either side of the width of the gap. This "fringing" of the flux pattern results in a write pattern which is typically twice as wide as the gap width. In such a situation, the resolution of the recorded data on the magnetic medium deteriorates rapidly as the distance from the track centerline increases. During read operations, however, only the actual gap width is involved in sensing the data on the medium, and the head thus responds only to the best portion of the actual recorded data. This is shown in FIG. 4A, in which the gap width, which is also the effective read width, is represented as $W_r$, and in which the width of the flux pattern actually written is represented as $W_w$. As can be seen in the figure, with a nominal physical gap width of "X", the track centerline, $T_{cl}$, of the next adjacent track cannot, therefore, be located any closer to the present track centerline than a distance of 2X without the magnetic patterns on adjacent tracks overlapping. Furthermore, in a typical tape drive of the current technology, there must also be an allowance made for the tolerances present in the head positioning mechanism, and a typical range for this allowance is on the order of ¼X. Thus the actual total track width, $W_t$, occupied by a track written by a head having a width of X would typically be 2.5X (X+(2×½X for write fringing)+(2×¼X for head actuator tolerance allowance)). As an example, for a head having a nominal gap width of 0.002 inches, the width of the flux pattern written would be 0.004 inches and a typical allowance for actuator tolerances would be 0.0005 inches. Thus the minimal track-to-track spacing would be 0.005 inches, and in fact, to ensure the integrity of data and to allow for other system tolerances, it would be more likely that the tracks would have to be centered at least 0.007 inches apart, providing an intertrack guard band of 0.002 inches.

FIG. 4B represents flux reversal patterns which would be expected to be found in a prior art tape drive system in which all efforts are made to minimize azimuth, that is to maintain azimuth as close to zero as is practical given normal component tolerances. In FIG. 4B, the vertical lines represent the locations of flux reversals on odd and even tracks as labeled. The location and density of flux reversals along the length of the data tracks is dependent on the data being represented and can thus be expected to vary, within certain commonly known limits, from data track to data track.

In that portion of the figure labeled "A", the width of the flux reversals (corresponding to the write width $W_w$ in FIG. 4A), represented by the height of the vertical lines in the figure, are shown to be closely adjacent, but not overlapping. Thus, if the heads are centered on the data tracks at the nominal track centers, as represented by lines labeled "D" and "E", it would be expected that data would be reliably recovered from either data track. If, however, the heads were displaced from nominal track center during read operations, it is apparent that flux reversals from the adjacent track could be expected to be at least partially read, potentially corrupting the desired data stream.

In that portion of FIG. 4B labeled "B", it can be seen that the ends of the flux reversals overlap. This is a representation of the situation that would occur if the head were not located precisely on nominal track center during writing of one or both of the illustrated data tracks, a condition incidental to normal tolerance variation in the head actuating mechanism of the tape drive 2. As can be seen, if the data tracks were indeed nominally spaced as closely as shown in portion "A" of FIG. 4B, such a condition could result in overlapping flux reversals as shown in portion "B", and the potential of data corruption even if the data heads were perfectly aligned with the nominal track centers "D" and "E" during subsequent read operations.

For these reasons, it is common practice in tape drive systems of this type to provide an intertrack guard band between adjacent tracks to prevent either the overlapping of data on adjacent tracks as shown at "B" in FIG. 4B, or the inadvertent reading of data from adjacent tracks due to tolerance variations in the head actuating mechanism, as mentioned above in reference to area "A" of FIG. 4B. For instance, in one actual representative prior art tape drive, the nominal width of the data track is 0.002 inches, and the cumulative tolerance in the head positioning mechanism is on the order of 0.0005 inches. In such a tape drive system, the data track centers designated as D' and E' are spaced 0.007 inches apart to specifically prevent the type of data track overlap shown at "B" in FIG. 4B. In consequence, the guard band between tracks is nominally 0.004 inches, or twice as wide as the nominal track width. This is the situation represented in that portion of FIG. 4B designated by the letter "C". It is well recognized that the inclusion of such guard bands between adjacent tracks limits the number of tracks which can be placed across a given width of tape, and thus limits the overall data capacity of the entire tape cassette.

FIG. 4C represents the flux reversal pattern achievable when the present invention is implemented. In FIG. 4C, the flux reversals representing recorded data are shown as slanted lines, with the direction of tilt of the lines representing the polarity of azimuth. In the figure, flux reversals are illustrated with positive azimuth for odd numbered tracks and with negative azimuth for even numbered tracks. Once again as in FIGS. 3B and 3C, the amount of azimuth is greatly exaggerated for illustrative purposes, and the specific polarity of azimuth introduced for odd and even tracks should not be considered as limiting to the scope of the invention. It should also be recalled that references to "odd" and "even" tracks are indicative of adjacent tracks within either the "forward" or "reverse" group of tracks.

In FIG. 4C, nominal track centers for adjacent odd and even tracks are shown at lines labeled "H" and "I", respectively. In the portion of FIG. 4C designated by the letter "F", the flux reversals of the odd and even tracks are shown as being closely adjacent, but not overlapping, while in the portion of the figure designated by the letter "G", the ends of the flux reversals from the adjacent tracks are shown to be overlapping by a small amount as could be the case due to cumulative tolerances in the head actuating mechanism, such as those noted above. It would be apparent to one of skill in the art that, even if the head were not aligned with the nominal track centers in portion "F" of the figure, any portion of flux reversal on an adjacent track which passed under the head during read operations would be oriented at such a large opposite azimuth as to prevent the head from sensing the flux reversal. Similarly, even where the flux reversals are seen to actually overlap, as in portion "G" of the figure, the magnitude of the opposite azimuth between adjacent tracks would effectively mask out any reading of flux reversals from an adjacent track.

From the foregoing discussion, it would be evident to one of skill in the art that any mechanism that facilitates the intentional introduction of opposite azimuth of sufficient magnitude on adjacent tracks would serve to minimize or eliminate adjacent track interference and thus fall under the scope of certain aspects of the present invention.

Examples of component combinations for a mechanism which is capable of implementing the present invention, as well as certain prior art combinations, are shown in FIGS. 5 through 9.

Figure 5:
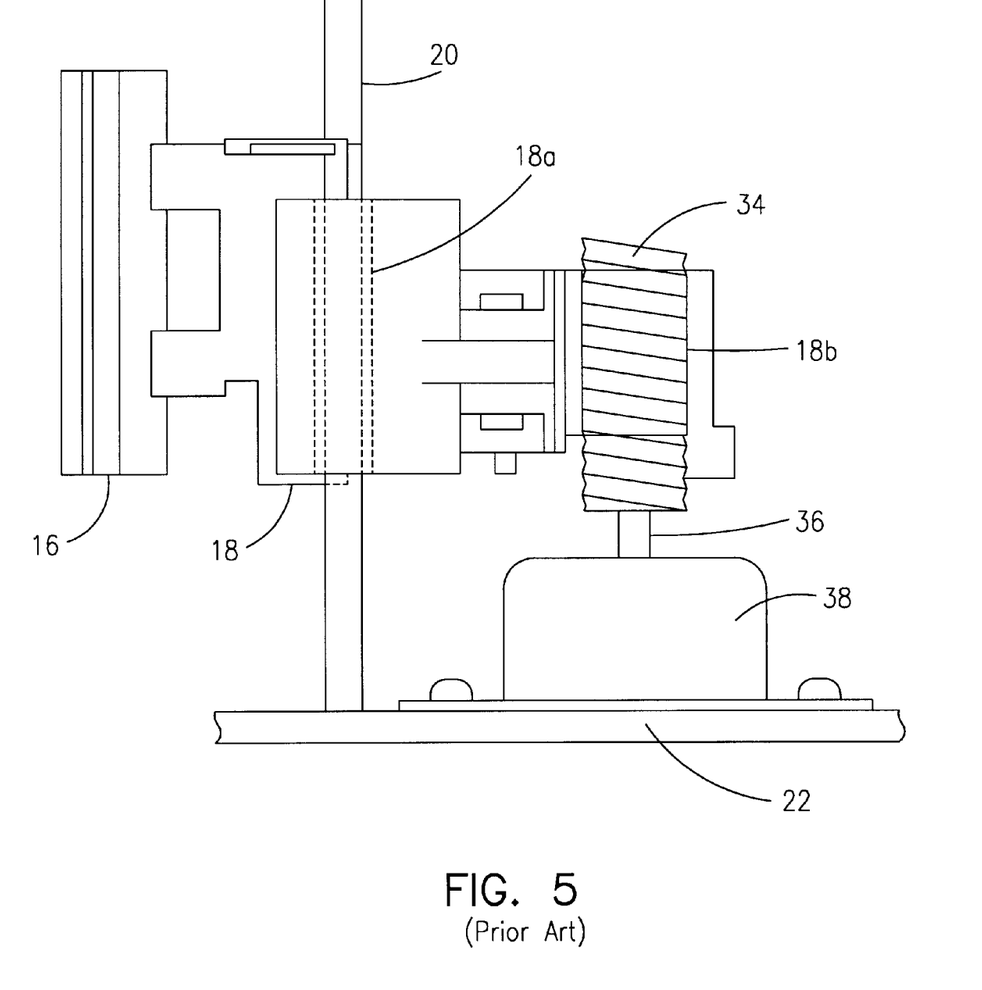
FIG. 5 is a simplified elevation view of a portion of the head actuating mechanism of a prior art tape drive.

Turning now to FIG. 5, shown is a simplified representation of a portion of a prior art head actuating mechanism. In the figure, the head 16 is shown attached to a head carriage 18 which includes a vertical guide hole 18a. This guide hole 18a engages a guide shaft 20 which controls the path of the head 16 as it is moved from track to track across the tape. In this prior art mechanism, the guide shaft 20 is fixedly mounted to a base member 22 of the tape drive in a nominal perpendicular relationship to the -B- plane of the tape drive/tape cassette system.

Motive power to drive the head 16 along the guide shaft 20 is provided by a threaded feature 18b also included in the head carriage 18. This threaded feature 18b engages a lead gear 34 which is in turn mounted on the driven shaft 36 of a stepper motor 38 which is activated under control of microcode and electronic circuitry in a manner well known in the industry. Thus, the head 16 is moved up and down in the figure, traversing the head 16 from track to track on the tape.

It will be appreciated by one of skill in the art that the precision of the actuating mechanism is controlled by several factors, including tolerances between the guide hole 18a and guide shaft 20, tolerance in the perpendicularity of the guide shaft 20 relative to the -B- plane, tolerances in the threaded feature 18b of the head carriage 18 and the lead gear 34 and the precision of the stepper motor 38 and associated drive electronics. It is these types of tolerance variations, along with similar tolerance variations in the tape cassette, that necessitate the inclusion of guard bands between adjacent tracks in tape drives of the prior art, limiting the number of data tracks which can be recorded on a given width of tape.

Figure 6:
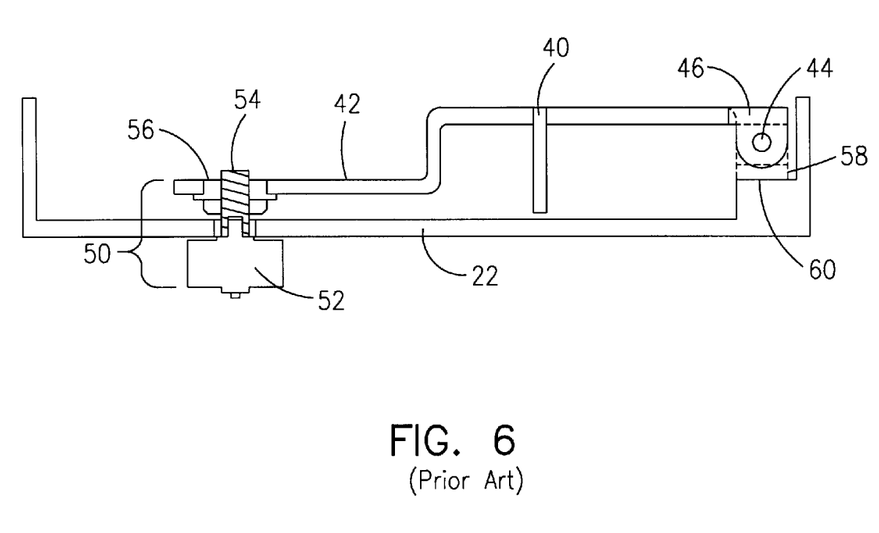
FIG. 6 is a simplified elevation view of components which implement the preferred embodiment of the present invention.
Figure 7:
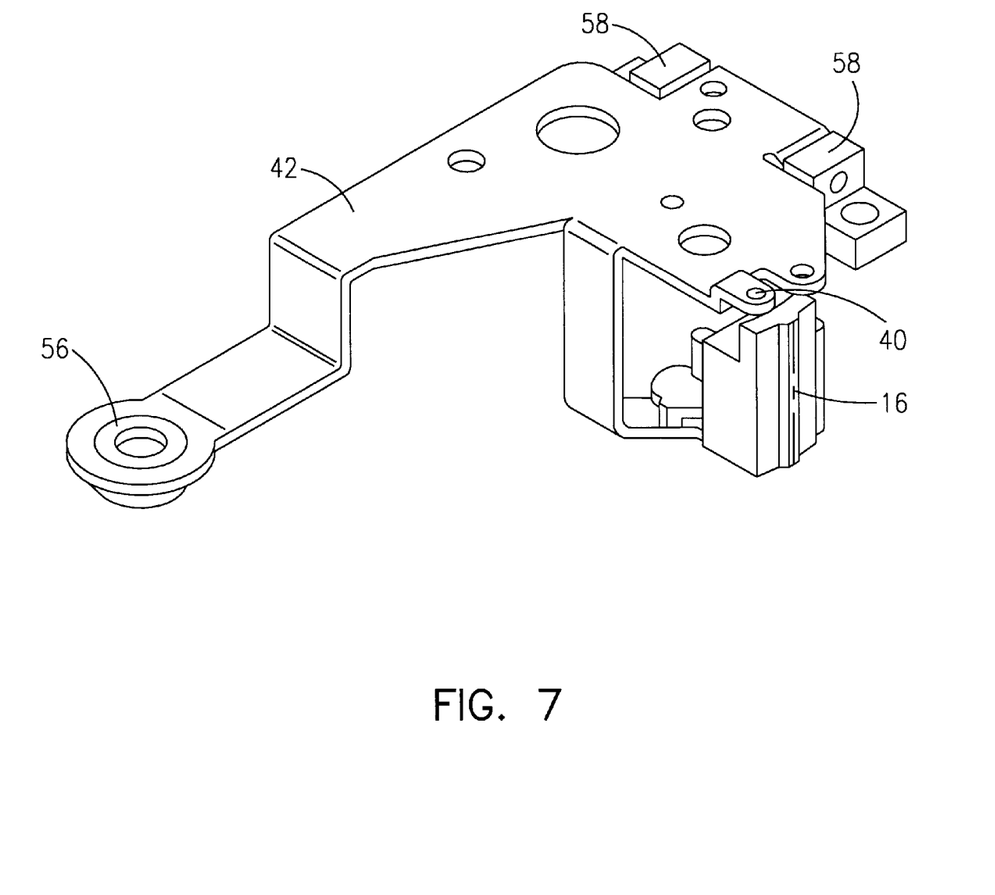
FIG. 7 is a perspective view of components which implement the preferred embodiment of the present invention.
Figure 7A:
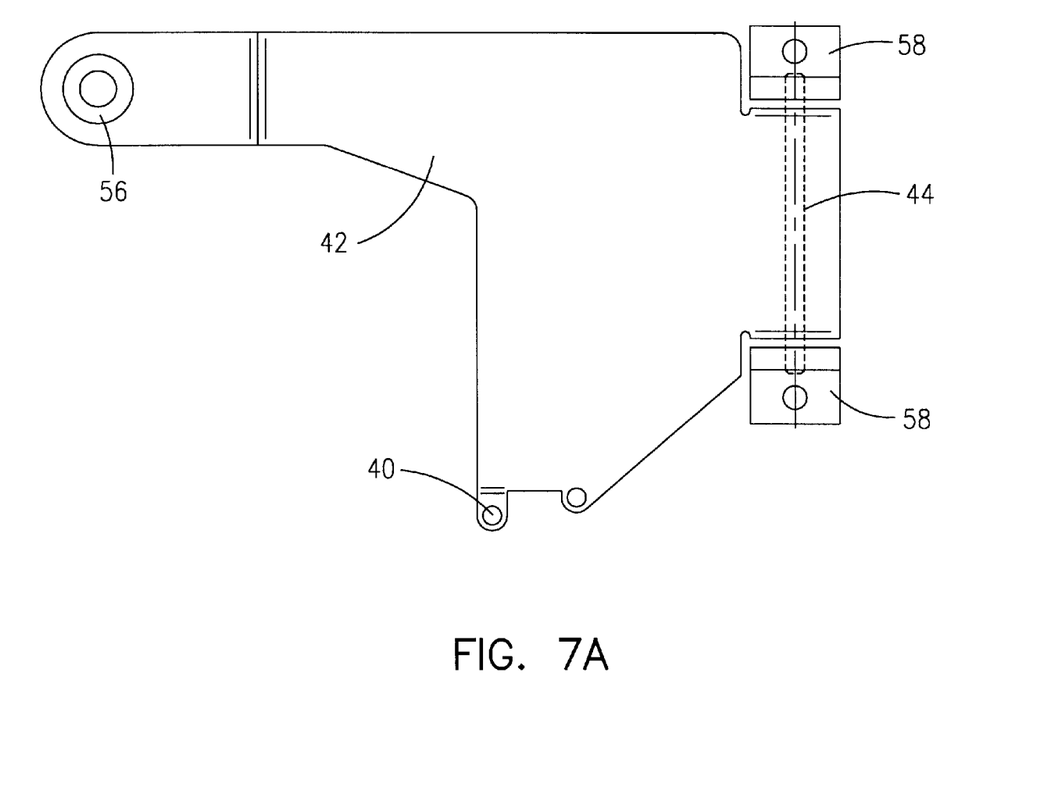
FIG. 7A is a simplified plan view of components which implement the preferred embodiment of the present invention.

Turning now to FIGS. 6, 7 and 7A, shown are simplified elevation, perspective and simplified plan views, respectively, of components used to implement the presently preferred embodiment of the apparatus of the present invention. In the figures, the guide shaft 40 used to control the path of motion of the head carriage (18 in FIG. 5) is mounted on an azimuth actuator base plate 42. Other head actuating components, such as the head actuator stepper motor shown in FIG. 5, would also be mounted on the azimuth actuator base plate 42, but have been omitted from FIGS. 6 and 7A for clarity.

FIGS. 6, 7 and 7A also show that the right end of the azimuth actuator base plate 42 is supported by a pivot shaft 44 which is displaced laterally from the head 16 and attached to the azimuth actuator base plate 42 by an arrangement of tabs 46. The pivot shaft 44 is located in parallel with the -B- plane of the tape system and substantially perpendicular to the -A- plane of the tape system, as defined in FIGS. 2A and 2B, and is supported in the tape drive 2 in a manner to be described below.

The figures also show that the left end of the azimuth actuator base plate 42 is supported and movable by an azimuth actuator mechanism, generally designated by reference numeral 50 in FIG. 6. The azimuth actuator mechanism 50 is capable of raising and lowering the left end of the azimuth actuator base plate 42, causing it to pivot about the pivot shaft 44. As the azimuth actuator base plate 42 pivots about the pivot shaft 44, the attached guide shaft 40 is also tilted away from a perpendicular relationship with the -B- plane, introducing positive azimuth as the azimuth actuator base plate 42 is lowered at the left end and negative azimuth as it is raised. The amount of introduced azimuth is determined by the extent to which the azimuth actuator base plate 42 is pivoted.

The presently preferred embodiment for the azimuth actuator mechanism 50 shown in FIG. 6, includes an azimuth stepper motor 52 fixedly mounted to the tape drive base member 22. The shaft of the azimuth stepper motor 52 incorporates a threaded shaft 54 which engages a nut 56 which is compliantly mounted to the azimuth actuator base plate 42. Compliance is necessary in mounting the nut 56 to the azimuth actuator base plate 42 due to the induced change in angle between the azimuth actuator base plate 42 and the azimuth stepper motor shaft 54 as the azimuth change occurs. When it is recalled that the present invention envisions that the difference between maximum positive azimuth and maximum negative azimuth is only 240 minutes or 4 degrees, it is clear that only slight compliance is necessary to provide sufficient "give" to compensate for the angle change between azimuth actuator base plate 42 and the azimuth stepper motor shaft 54 which will provide the desired azimuths at the guide shaft 40.

FIGS. 6, 7 and 7A also show that the pivot shaft 44 is supported near its ends by a pair of pivot guide bushings 58, shown in FIG. 6 by dotted lines. These pivot guide bushings 58 allow the pivot shaft 44, which is fixedly attached to the azimuth actuator base plate 42, to pivot. FIG. 6 also shows that the tape drive base member 22 includes pivot bushing reference surfaces, one shown at 60, which determine the vertical position of the pivot shaft 44 and via the pivot shaft, the elevation of the right end of the azimuth actuator base plate 42. It would also be apparent to one of skill in the art that control of the location of the pivot bushing reference surfaces would also enable control of those aspects of head/tape geometry referred to as zenith and tilt.

Figure 8:
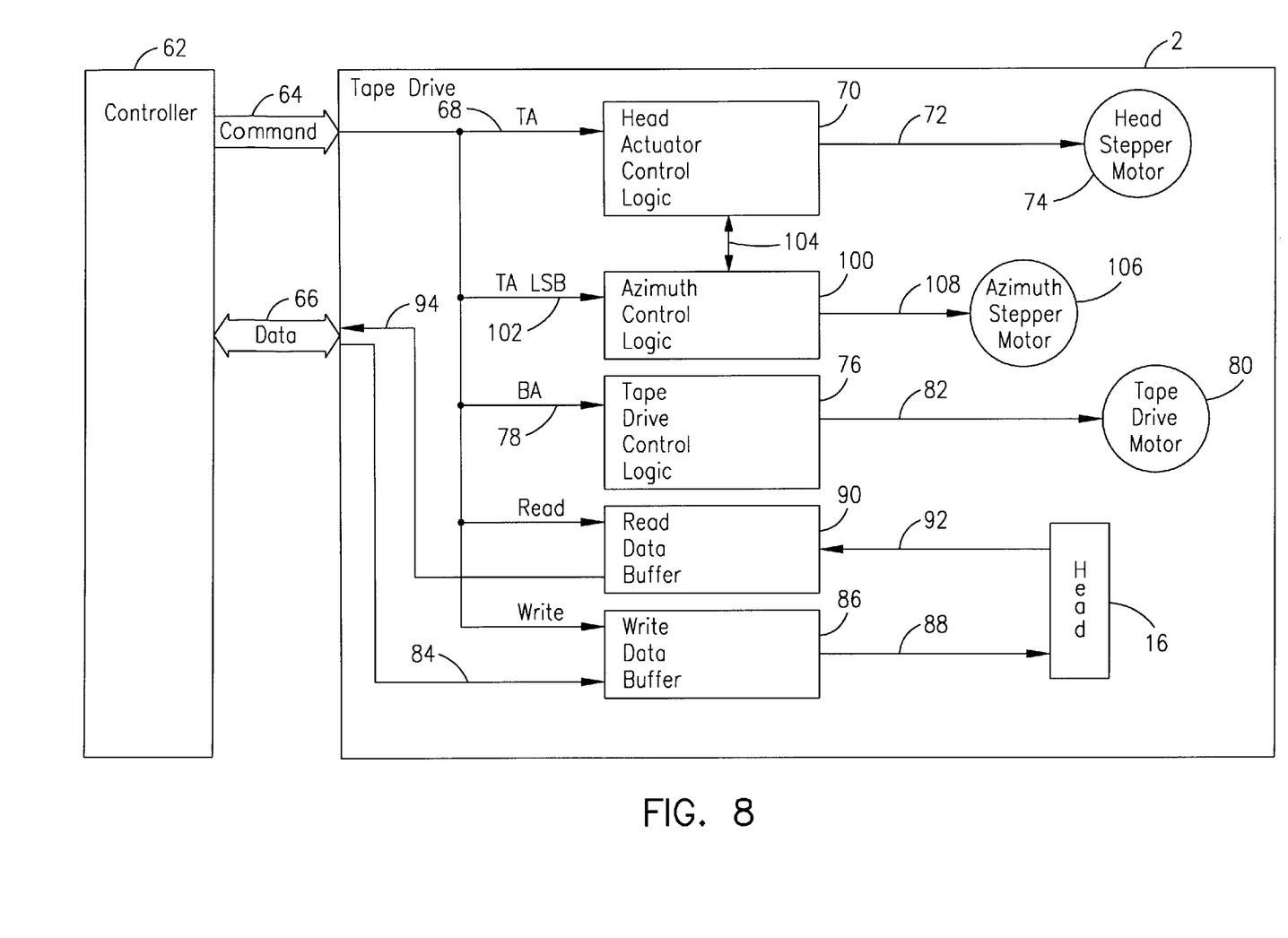
FIG. 8 is a simplified block diagram of control circuitry useful in implementing the present invention.

FIG. 8 shows a simplified block diagram of a controller 62 attached to the tape drive 2 and a representation of the control circuitry in the tape drive 2 which is used to implement the present invention. In the figure, command information is transferred to the tape drive 2 via a Command Bus 64. This command information would typically include such information as the number of the data track to be accessed, designation of the location of the data on the track being accessed, and whether the command is to write/record data or read/retrieve data on that track. Such information would reflect requests for data transfer from a host computer system (not shown) in accordance with operating system software in a manner well known in the industry.

The actual data being transferred between the tape drive 2 and the controller 62 is passed via a bidirectional Data Bus 66, with the direction of transfer being a function of the command received by the tape drive 2 via the Command Bus 64.

Within the tape drive 2, a data transfer is initiated upon receipt of the command via the Command Bus 64. The command includes a track address (TA), which defines the data track on which the transfer is to take place. This track address is applied via path 68 to the head actuator control logic 70 where a comparison is made between the desired track and an internally maintained current track. If the current track and the desired track are the same, no further action on the part of the head actuator control logic 70 is needed, except perhaps to set an internal flag notifying other internal tape drive logic that the head is at the desired track. If, however, the desired track and the current track differ, the head actuator control logic 70 determines the direction and distance of the desired track from the current track and sends drive signals via path 72 to the head actuator stepper motor 74 to drive the head to the desired track, at which time the internal flag indicating that the head is on the desired track is set.

Similarly, a block address (BA) defining the location of the desired data transfer along the desired track is sent to the tape drive control logic 76 via path 78. Again, a comparison is made between the desired block address and an internally maintained current block address, and control signals necessary to move the tape to the desired block address are passed to the tape drive motor 80 via path 82. It should be recalled that not only does the tape drive control logic 76 have to move the tape to the desired block address, but it also has to ensure that the tape is moving relative to the head in the proper direction and at the proper speed to facilitate the data transfer. Such considerations are within the competence of a person of skill in the art and are not specifically within the scope of the present invention.

Once the head actuator control logic 70 and tape drive control logic 76 have properly positioned the head and the tape for the requested data transfer, the data transfer actually takes place via the head. If the requested data transfer is a data write, the data to be written is transferred to the tape drive via the Data Bus 66, across path 84 and stored temporarily in the write data buffer 86 for timed transfer to the head 16 via path 88. If, however, the requested data transfer is a data read, the data is read by the head 16 and transferred to the read data buffer 90 via path 92, where it is held temporarily before being transferred via path 94 and thence via the Data Bus 66 to the controller 62, and ultimately to the host computer (not shown).

All of the control and data transfer functions described immediately above are applicable not only to tape drives incorporating the present invention, but to tape drives of the prior art.

FIG. 8 also shows control logic necessary to the implementation of the present invention. Specifically, the figure includes azimuth control logic 100, which receives as a primary input the least significant bit of the track address (TA LSB) on path 102. The azimuth control logic 100 works in close cooperation with the head actuator control logic 70, as shown by the connecting path 104. Specifically, when a command is received by the tape drive 2 via the Command Bus 64, the azimuth control logic 100 determines if the desired track is an even or odd numbered track. This determination is then compared with an internally stored indication of whether the head is currently aligned with an odd or even numbered track. Whether any action is required of the azimuth control logic 100 is a result of this comparison. If, for instance, the head is currently aligned with an even track and the desired track for the requested data transfer is also an even track, then the azimuth control logic 100 need do nothing for the requested transfer. If, however, the head is currently aligned with an odd numbered track and the requested transfer is to take place on an even numbered track, or vice versa, the azimuth control logic 100 would have to provide those drive signals necessary to change the azimuth of the head 16 to the azimuth stepper motor 106 via path 108. Any necessary change of the azimuth of the head would occur concurrently with the necessary movement of the head, as controlled by the head actuator control logic 70.

Figure 9:
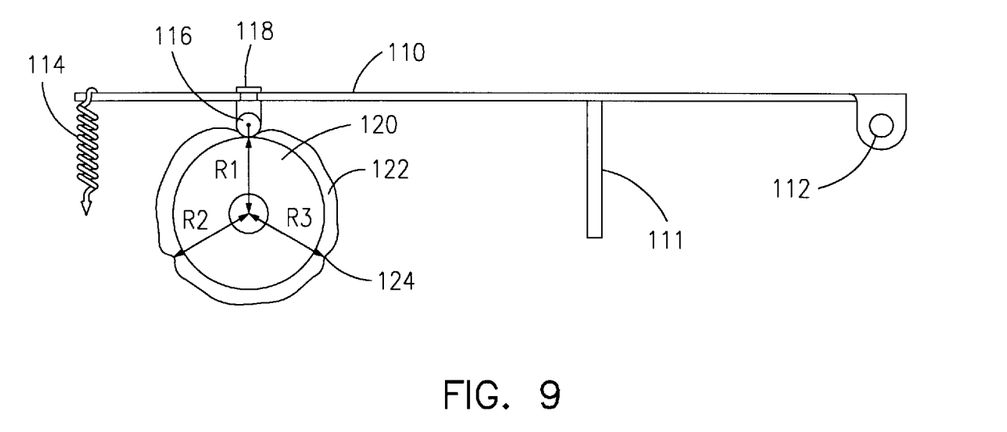
FIG. 9 is a simplified elevation view of components which make up an alternative embodiment of certain portions of the present invention.

FIG. 9 is a simplified elevation view of components used to implement an alternative embodiment of an azimuth actuator mechanism made in accordance with the present invention. This alternative azimuth actuator mechanism includes an azimuth actuator base plate 110, which is substantially planar, as opposed to the stepped azimuth base plate 42 of FIGS. 6, 7 and 7A. The azimuth actuator base plate 110 also includes a head actuator guide shaft 111, such as that described previously, and mounting holes 112 for a pivot shaft (not shown) which operates as in the previously described preferred embodiment.

The second end of the azimuth actuator base plate 110 is adapted for attachment to a spring 114, which tends to draw the left end of the azimuth actuator base plate 110 downward in the figure. Also carried on the azimuth actuator base plate 110 is a cam follower 116 which is supported on the azimuth actuator base plate 110 by a cam follower bracket 118.

Power to change the azimuth of the head (not shown) is provided by a stepper motor 120 which drives a cam member 122. The cam member 122 includes three detent notches (one labeled with numerical reference 124) spaced substantially 120° apart.

From the figure it can be seen that the three detent notches 124 have inner extremes that lie at three differing radii, R1, R2 and R3, with R1<R2<R3. With this arrangement, when the cam follower 116 is located in the detent notch 124 with radius R1, the azimuth actuator base plate 110 is in its most counterclockwise position. When the cam follower 116 engages the detent notch 124 with radius R3, the azimuth actuator base plate 110 is in its most clockwise position. These counterclockwise and clockwise positions correspond to the desired positive and negative azimuth angles, respectively. Thus, the cam member 122 would be rotated to bring the detent notch 124 with radius R1 into alignment with the cam follower 116 for accesses to all odd numbered tracks, and to bring the detent notch 124 with radius R3 into alignment with the cam follower 116 for accesses to all even numbered tracks, under control of control circuitry as previously described in relationship to FIG. 8.

It will be apparent to one of skill in the art that, when the cam member 122 is rotated to bring the detent notch 124 with radius R2 into alignment with the cam follower 116, the azimuth actuator base plate 110 will be at a position between the positive and negative azimuth positions, and it is the intent of this embodiment that this position of the cam member 122 would place the head (not shown) into a zero azimuth relationship with the tape. Having the ability to place the head at zero azimuth permits a tape drive made in accordance with the present invention to read tapes previously recorded on prior art compatible tape drives. It would also be apparent to one of skill in the art that the previously described preferred embodiment would also be capable of positioning the head at a zero azimuth relationship, and thus would also be capable of providing this aspect of backward compatibility.

Of course, such backward compatibility also requires that the tape drive also be capable of recognizing the fact that the tape cassette was recorded on a prior art tape drive, and the ability to control the positioning of the head in compliance with the wider track spacing of the prior art tape drive, but these considerations are not within the scope of the present invention.

From the foregoing discussion, it is apparent that the present invention meets the objects set forth above, while providing all of the benefits described as well as those inherent therein. While certain embodiments of the invention have been described herein, minor modifications to these embodiments may become obvious to a person of skill in the art upon reading this disclosure which are within the envisioned scope of the invention. Therefore, the scope of the invention should be considered to be limited only by the appended claims.

What is claimed is:

1. In a tape drive for a data storage system, the tape drive including a base member and a read/write head for recording data on and retrieving data from a plurality of data tracks on magnetic tape and further including head actuating means for translating said head from data track to data track across the width of the tape and head actuator control logic for controlling said head actuating means, said head being capable of recovering data previously recorded on said tape only when said previously recorded data is oriented on said tape within an azimuth range having a first azimuth magnitude relative to the orientation of said head during said data recovery, the improvement comprising:

an azimuth actuator base plate on which said head actuating means is mounted;

azimuth pivot means, located at a first end of said azimuth actuator base plate and connecting said azimuth actuator base plate to said base member, said first end being displaced in a first direction from said head along an axis substantially parallel with a direction of tape motion past said head, for allowing said azimuth actuator base plate to pivot relative to said tape;

azimuth actuator means, located at a second end of said azimuth actuator base plate, said second end being displaced in a second direction from said head along said axis from said first end, for pivoting said azimuth actuator base plate about said azimuth pivot means; and azimuth control logic for controlling said azimuth actuator means and pivoting said azimuth actuator base plate to introduce an azimuth of a second magnitude greater than said first azimuth magnitude in a first direction for all accesses to a first set of data tracks consisting of all even numbered tracks, and to introduce azimuth of said second magnitude in a second direction opposite said first direction for all accesses to a second set of data tracks consisting of all odd numbered tracks.

2. The improvement of claim 1 in which said azimuth actuator means comprises:

an azimuth stepper motor having a driven shaft and being fixedly mounted to said base member;

a threaded member mounted on said driven shaft; and a nut member compliantly mounted on said second end of said azimuth actuator base plate, said threaded member engaging said nut member.

3. The improvement of claim 1 in which said azimuth actuator means comprises:

an azimuth stepper motor having a driven shaft and being fixedly mounted to said base member;

a cam member carried on said driven shaft and having first and second detent notches, said detent notches having inner extremes lying at first and second radii, respectively, from the axis of said driven shaft, said second radius being greater than said first radius;

a cam follower, mounted on said azimuth actuator base plate for engagement with said detent notches; and a spring member for encouraging said cam follower into engagement with said cam member.

4. The improvement of claim 3 in which said cam member includes a third detent notch having an inner extreme at a third radius, said third radius being greater than said first radius and less than said second radius, whereby, when said cam is rotated by said stepper motor to align said third detent notch with said cam follower, said azimuth actuator base plate is pivoted to provide zero azimuth angle between said head and said data tracks on said tape.

* * * * *